United States Patent
Momose et al.

(10) Patent No.: US 12,105,046 B2
(45) Date of Patent: Oct. 1, 2024

(54) GAS SENSOR AND SENSOR DEVICE

(71) Applicant: FUJITSU LIMITED, Kawasaki (JP)

(72) Inventors: Satoru Momose, Atsugi (JP); Osamu Tsuboi, Kawasaki (JP); Ikuo Soga, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 18/207,051

(22) Filed: Jun. 7, 2023

(65) Prior Publication Data
US 2023/0324328 A1  Oct. 12, 2023

Related U.S. Application Data

(60) Division of application No. 16/718,054, filed on Dec. 17, 2019, now abandoned, which is a division of application No. 15/353,006, filed on Nov. 16, 2016, now Pat. No. 10,670,552, which is a continuation of application No. PCT/JP2014/065203, filed on Jun. 9, 2014.

(51) Int. Cl.
*G01N 27/407* (2006.01)
*G01N 27/406* (2006.01)

(52) U.S. Cl.
CPC ..... *G01N 27/4071* (2013.01); *G01N 27/4073* (2013.01); *G01N 27/4065* (2013.01)

(58) Field of Classification Search
CPC ........... G01N 27/4071; G01N 27/4073; G01N 27/4065
See application file for complete search history.

(56) References Cited

U.S. PATENT DOCUMENTS

| | | |
|---|---|---|
| 5,128,020 A | 7/1992 | Yamauchi |
| 6,985,082 B1 | 1/2006 | Dutta |
| 2005/0072213 A1 | 4/2005 | Besnard |
| 2010/0112546 A1 | 5/2010 | Lieber |
| 2011/0089051 A1 | 4/2011 | Wang |
| 2011/0124113 A1 | 5/2011 | Azad |
| 2013/0115705 A1 | 5/2013 | Patolsky |

FOREIGN PATENT DOCUMENTS

| | | | |
|---|---|---|---|
| CA | 2449549 A1 * | 5/2004 | ......... G01N 27/4045 |
| DE | 68916743 T2 | 11/1994 | |
| JP | S63-238545 A | 10/1988 | |
| JP | H02-114168 | 4/1990 | |
| JP | H7-140100 A | 6/1995 | |
| JP | 2001-289809 A | 10/2001 | |

(Continued)

OTHER PUBLICATIONS

Seguin (J.-L. Seguin, Degradation during sputter deposition of solid electrolyte thin films for microsystems, Thin Solid Films 2002(422), p. 87-91. (Year: 2002).*

(Continued)

*Primary Examiner* — C. Sun
(74) *Attorney, Agent, or Firm* — Kratz, Quintos & Hanson, LLP

(57) ABSTRACT

A gas sensor which includes a solid electrolyte layer including positive charge carriers to which detection-target gas coordinates, an electrode arranged on part of a plane of the solid electrolyte layer, and a unit configured to accelerate movements of the positive charge carriers.

10 Claims, 12 Drawing Sheets

(56) References Cited

FOREIGN PATENT DOCUMENTS

| JP | 2002-031619 A1 | 1/2002 |
| JP | 2003-315299 A | 11/2003 |
| JP | 2004-77458 A | 3/2004 |
| JP | 2005-221428 A1 | 8/2005 |
| JP | 2007-248335 A1 | 9/2007 |
| JP | 2008-145128 A1 | 6/2008 |
| JP | 2008145128 A * | 6/2008 |
| JP | 2009-19934 A | 1/2009 |
| JP | 2009-198346 A1 | 9/2009 |
| JP | 2013-529308 A | 7/2013 |
| WO | 00/39880 A1 | 7/2000 |
| WO | 03/046536 A1 | 6/2003 |
| WO | 2011/066383 A1 | 6/2011 |

OTHER PUBLICATIONS

M. Bendahan, et al.; "Development of an ammonia gas sensor"; Sensors and Actuators B; 95; 2003; pp. 170-176 (7 pages).

Office Action of U.S. Appl. No. 15/070,325 dated Aug. 31, 2018 (5 pages).

Office Action of U.S. Appl. No. 15/070,325 dated Feb. 8, 2018 (6 pages).

Office Action of U.S. Appl. No. 15/070,325 dated Jan. 14, 2019 (8 pages).

Office Action of Chinese Patent Application No. 201480079329.X dated Dec. 17, 2018 (5 pages, 8 pages translation, 13 pages total).

Office Action of Japanese Patent Application No. 2015-104222: Notification of Reasons for Refusal dated Oct. 23, 2018 (4 pages, 3 pages translation, 7 pages total).

International Search Report for International Application No. PCT/JP2014/065203 dated Sep. 2, 2014.

Written Opinion of the International Searching Authority for International Application No. PCT/JP2014/065203 dated Sep. 2, 2014 (4 Sheets, 3 Sheets translation, 7 Sheets total).

P. Lauque, et al.; "Highly sensitive and selective room temperature NH3 gas microsensor using an ionic conductor (CuBr) film;" Analytica Chimica Acta; vol. 515; 2004; pp. 279-284 (6 Sheets)/Cited in International Search Report 'p. 2 of specification.

P. Lauque, et al.; "Electrical properties and sensor characteristics for NH3 gas of sputtered CuBr films;" Sensors and Actuators B; vol. 59; 1999; pp. 216-219 (4 Sheets)/Cited in International Search Report.

M. Bendahan, et al.; "Development of an ammonia gas sensor;" Sensors and Actuators B; vol. 95; 2003; pp. 170-176 (7 Sheets)/Cited in International Search Report.

P. Lauque, et al.; "Electrical Properties of Thin-films of the Mixed Ionic-electronic Conductor CuBr: Influence of Electrode Metals and Gaseous Ammonia;" Journal of the European Ceramic Society; vol. 19; 1999; pp. 823-826 and front sheets (2), (6 Sheets total)/Cited in International Search Report.

B. Wolpert, et al.; "Chemosensitive properties of electrically conductive Cu(I) compounds at room temperature;" Sensors and Actuators B; vol. 134; 2008; pp. 839-842 (4 Sheets)/Cited in International Search Report.

International Search Report for International Application No. PCT/JP2014/065213 dated Sep. 2, 2014 (2 Sheets).

Office Action for U.S. Appl. No. 15/070,325, issued on Feb. 8, 2018 (8 Sheets).

J.-L. Seguin et al.; "Preparation of thin films of copper(I) bromide by r.f. sputtering: morphology and electrical properties;" Thin Solid Films; vol. 323; Dec. 31, 1998; pp. 31-36 (6 Sheets).

Chinese Office Action issued to CN Application No. 201480079329.X, dated May 30, 2018 (22 Sheets).

Office Action of corresponding Chinese Patent Application No. 201480079329.X dated Nov. 7, 2019 (5 sheets, 10 sheets translation, 15 sheets total).

Office Action of corresponding German Patent Application No. 112014006731.8 dated May 30, 2022 (9 sheets, 8 sheets translation, 17 sheets total).

A. Sagade, et al.; "Copper sulphide (CuxS) as an ammonia gas sensor working at room temperature"; Sensors and Actuators B: Chemical; 2008; vol. 13; No. 1; pp. 135-143 (9 pages).

B. Wolpert, et al.; "Gas sensing properties of electrically conductive Cu(I) compounds at elevated temperatures"; Sensors and Actuators B: Chemical; 2009; vol. 142; No. 2; pp. 446-450 (5 pages).

P. Lauque; "De la couche sensible au system: depot par plasma froid et capteurs de gaz"; 2009; Habilitation thesis Universite Paul Cezanne-Aix-Marseille III; pp. 46-71 (92 pages, 97 pages translation, 189 pages total).

Figaro Engineering Inc.; "The World Leader in Gas Sensing Innovation"; company publication; Sep. 23, 2012; URL: https://aesensors.nl/assets/uploads/2015/07/catalog.pdf (2 sheets).

Image brochure 90 70 305; Corporate Communications; (c) 2011; Dragerwerk AG & CO. KGaA—Firmenschrift; company publication; Nov. 9, 2011; URL: http://web.archive.org/web/20140323055907if_/http://www.draeger.com:80/sites/assets/PublishingImages/Segments/Company/DE/Karriere/Sidebar/imagebroschuere.pdf (20 sheets, 24 sheets translation, 44 sheets total).

M. Bendahan, et al.; "Morphology, Electrical Conductivity, and Reactivity of Mixed Conductor CuBr Films: Development of a New Ammonia Gas Detector"; Journal of Physical Chemistry B; vol. 105; 2001; ISSN 1520-6106; pp. 8327-8333 (7 pages).

K. Funke; "Solid State Ionics: from Michael Faraday to green energy—the European dimension"; Science and Technology of Advanced Materials; 2013 pp. 1-50 (50 pages, 1 cover sheet, 51 sheets total).

Office Action of Chinese Patent Application No. 201480079329.X dated Mar. 18, 2020 (4 sheets, 7 sheets translation, 11 sheets total).

T. Fu; "Silver sulfide-based sensor for the selective determination of ammonia at room temperature"; Electrochimica Acta;121; 2014; pp. 168-174 (7 pages).

M. Bendahan, et al.; "Development of an ammonia gas sensor"; Sensors and Actuators B; 95; 2003; pp. 170-175 (7 pages).

\* cited by examiner

GAS SENSOR AND SENSOR DEVICE

CROSS-REFERENCE TO RELATED APPLICATION

This application is a continuation application of International Application PCT/JP2014/065203 filed on Jun. 9, 2014 and designated the U.S., the entire contents of which are incorporated herein by reference.

FIELD

The embodiments discussed herein relate to a gas sensor, and a sensor device including the gas sensor.

BACKGROUND

As gas sensors detecting gas, such as ammonia and nitrogen oxide, gas sensors that detect gas based on changes in electrical resistance have been conventionally used. The gas sensors detect the gas based on changes in electrical resistance of a semiconductor, such as tin dioxide, due to absorption of the gas on a surface of the semiconductor.

In the gas sensors that detect gas based on changes in electrical resistance, electric current needs to be supplied to the semiconductor using a constant-current power supply in order to measure changing electrical resistance. Therefore, the gas sensors that detect gas based on changes in electrical resistance have a problem that power consumption of a detection circuit itself becomes large.

Moreover, the semiconductor in the gas sensor needs to be heated to a temperature (for example, 400° C.) at which excellent detection properties can be obtained. Therefore, the gas sensor has a problem that a large quantity of power needs to be used for a heater configured to heat the gas sensor.

Accordingly, proposed are gas sensors, which detect gas based on changes in potential difference due to adsorption of the gas, not changes in electrical resistance. As such gas sensors, proposed are gas sensors using solid electrolytes having ion conductivity, such as oxygen ion conductivity, oxide ion conductivity, and proton conductivity (for example, see Japanese Patent Application Laid-Open (JP-A) Nos. 2002-031619, 2005-221428, 2007-248335, and 2009-198346).

In the proposed techniques, however, temperatures, at which the solid electrolytes for use (e.g., zirconia) exhibit excellent ion conductivity, are high temperature of 300° C. or higher. In the proposed techniques, moreover, a chemical reaction, such as an oxidation reaction, of gas to be adsorbed is used for causing a change in a potential difference in the solid electrolyte, and therefore the gas sensor needs to be heated to a temperature at which the chemical reaction is induced.

Accordingly, the proposed techniques have a problem that a large quantity of power needs to be used for a heater configured to heat the gas sensor.

Moreover, proposed as a gas sensor detecting gas at room temperature is a gas sensor, which is highly sensitive, is capable of highly selectively detecting $NH_3$ gas at room temperature, and uses a CuBr film (for example, see Pascal Lauque, Marc Bendahan, Jean-Luc Seguin, Kieu An Ngo, Philippe Knauth, Analytica Chimica Acta, 515, (2004), 279-284). In the proposed technique, gas is detected based on a change in electrical resistance. Accordingly, it is necessary to supply electric current to the CuBr film using a constant-current power supply in order to measure changes in electrical resistance, and there is a problem that power consumption of a detection circuit itself becomes large.

Accordingly, there is currently a need for a gas sensor that does not require a supply of electric current using a constant current power supply, does not need to be heated, and can be used with energy-saving efficiency, and a sensor device including such a gas sensor.

SUMMARY

According to the first aspect of the disclosed gas sensor, the disclosed gas sensor includes:
  a solid electrolyte layer including positive charge carriers to which detection-target gas is to coordinate;
  a first electrode arranged on part of one plane of the solid electrolyte layer; and
  a second electrode arranged on an area of the other plane of the solid electrode layer, the area excluding an area of the other plane that faces the first electrode and is to be in contact with the detection-target gas.

According to the second aspect of the disclosed gas sensor, the disclosed gas sensor includes:
  a solid electrolyte layer including positive charge carriers to which detection-target gas is to coordinate;
  a first electrode and a second electrode, both of which are arranged on a plane of the solid electrolyte layer opposite to the plane of the solid electrolyte layer to be in contact with the detection-target gas; and
  a unit configured to accelerate movements of the positive charge carriers, where the movements of the positive charge carriers are movements in a plane direction of the solid electrolyte layer and in a direction from the second electrode to the first electrode within the solid electrolyte layer.

The disclosed sensor device includes:
  the disclosed gas sensor; and
  a unit configured to detect a change in a potential difference of the gas sensor, where the unit is connected to the first electrode of the gas sensor.

The disclosed gas sensor can solve the above described various problems existing in the art, and can provide a gas sensor, which does not need a supply of electric current using a constant current power supply, does not need to be heated, and can be used with energy-saving efficiency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS (Gas Sensor)

First Embodiment

Figure 1A:
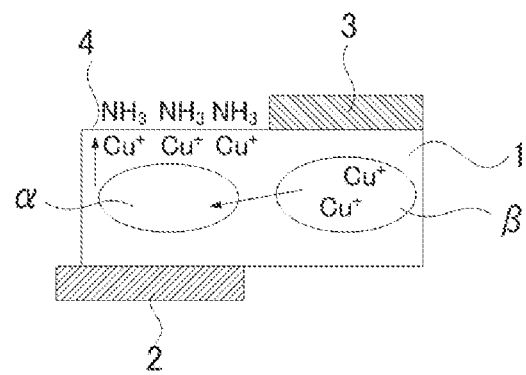
FIG. 1A is a schematic cross-sectional view illustrating one example of the first embodiment of the disclosed gas sensor.

The first embodiment of the disclosed gas sensor includes at least a solid electrolyte layer, a first electrode, and a second electrode, and may further include other members according to the necessity.

<<Solid Electrolyte Layer>>

The solid electrolyte layer is not particularly limited, and may be appropriately selected depending on the intended purpose, as long as the solid electrolyte layer includes positive charge carriers to which detection-target gas coordinates.

The positive charge carriers are preferably movable at normal temperature.

In the present specification, the term "normal temperature" means a temperature of a state where the gas sensor is not heated, and is for example 25° C.

The term "movable" means that the positive charge carriers can move to a degree that a change in a potential difference of the gas sensor can be confirmed.

The detection-target gas is not particularly limited, and may be appropriately selected depending on the intended purpose, as long as the detection-target gas is gas capable of coordinating to the positive charge carriers. Examples of the gas capable of coordinating to the positive charge carrier include nitrogen-including compounds, oxygen-containing compounds, and sulfur-containing compounds. Examples of the nitrogen-including compounds include ammonia, amine, and nitric oxide. Examples of the sulfur containing compound include hydrogen sulfide and sulfur dioxide.

The positive charge carriers are not particularly limited, and may be appropriately selected depending on the intended purpose, as long as the positive charge carriers are carriers to which the detection-target gas coordinates. In view of excellent carrier mobility, the positive charge carriers are preferably copper ions, or silver ions, or both copper ions and silver ions.

A material of the solid electrolyte layer is not particularly limited, and may be appropriately selected depending on the intended purpose. Examples of the material include copper (I) bromide (CuBr), copper (I) sulfide ($Cu_2S$), silver sulfide ($Ag_2S$), silver iodide (AgI), and silver rubidium iodide ($RbAg_4I_5$). Since the above-listed solid electrolytes have sufficient mobility of the positive charge carriers even at normal temperature (for example, 25° C.), the above-listed solid electrolytes can be used for the solid electrolyte layer. Among the above-listed solid electrolytes, copper (I) bromide is preferable because of excellent mobility of positive charge carriers at normal temperature.

A shape, size, and structure of the solid electrolyte layer are not particularly limited, and may be appropriately selected depending on the intended purpose.

A formation method of the solid electrolyte layer is not particularly limited, and may be appropriately selected depending on the intended purpose. Examples of the formation method include sputtering. In the case where a material of the solid electrolyte layer is copper (I) bromide, examples of the formation method include a method in which cupper is immersed in a copper (II) bromide aqueous solution to turn the copper into copper (I) bromide.

<<First Electrode>>

The first electrode is not particularly limited, and may be appropriately selected depending on the intended purpose, as long as the first electrode is an electrode arranged on part of one plane of the solid electrolyte layer.

Examples of a material of the first electrode include metals more noble than a metal element of the positive charge carriers.

Moreover, the material of the first electrode is preferably the same metal to the metal element of the positive charge carrier because potential of the solid electrolyte layer becomes stable. In the case where the first electrode has a laminate structure, a material of an electrode to be in contact with the solid electrolyte layer is preferably the same metal to the metal element of the positive charge carrier.

A shape, size, and structure of the first electrode are not particularly limited, and may be appropriately selected depending on the intended purpose.

The average thickness of the first electrode is not particularly limited, and may be appropriately selected depending on the intended purpose. The average thickness of the first electrode is preferably equal to or less than the average thickness of the solid electrolyte layer.

A formation method of the first electrode is not particularly limited, and may be appropriately selected depending on the intended purpose. Examples of the formation method include vacuum deposition.

<<Second Electrode>>

The second electrode is not particularly limited, and may be appropriately selected depending on the intended purpose, as long as the second electrode is an electrode arranged on the other plane of the solid electrode, excluding an area of the other plane that faces the first electrode and to be in contact with the detection-target gas.

Examples of a material of the second electrode include metals more noble than a metal element of the positive charge carriers.

Moreover, the material of the second electrode is preferably the same metal to the metal element of the positive charge carrier because potential of the solid electrolyte layer becomes stable. In the case where the second electrode has a laminate structure, a material of an electrode to be in contact with the solid electrolyte layer is preferably the same metal to the metal element of the positive charge carrier.

A shape, size, and structure of the second electrode are not particularly limited, and may be appropriately selected depending on the intended purpose.

A formation method of the second electrode is not particularly limited, and may be appropriately selected depending on the intended purpose. Examples of the formation method include vacuum deposition.

<<Other Units>>

The above-mentioned other units are not particularly limited, and may be appropriately selected depending on the intended purpose. Examples of the units include a unit configured to accelerate movements of the positive charge carriers.

—Unit Configured to Accelerate Movements of Positive Charge Carriers—

Examples of the unit configured to accelerate movements of the positive charge carriers include a layer, which is arranged on an area of the other plane of the solid electrolyte layer, where the area faces the first electrode and is to be in contact with the detection-target gas, includes a material capable of coordinating to the positive charge carriers, and allows the detection-target gas to pass therethrough. Since the gas sensor includes the unit configured to accelerate movements of the positive charge carriers, movements of the positive charge carriers in the solid electrolyte layer are accelerated to increase a change in a potential difference.

The layer that includes a material capable of coordinating to the positive charge carriers and allows the detection-target gas to pass through. Therefore, the layer does not interfere coordinates of the detection-target gas to the positive charge carriers of the solid electrolyte layer.

Examples of the material capable of coordinating to the positive charge carrier include an organic material including a carbon-carbon double bond. Examples of the organic material including a carbon-carbon double bond include natural rubber (polyisoprene), synthetic rubber, such as polyisoprene and polybutadiene, unsaturated fatty acid, unsaturated fatty acid ester, and unsaturated fatty acid amide. Examples of the unsaturated fatty acid include oleic acid and linoleic acid.

Note that, the carbon-carbon double bond has an ability for supplying electrons to atoms and ions of a transition metal to form a coordinate bond. Accordingly, the solid electrolyte layer can be doped with electrons when the organic material coordinates to the positive charge carriers. As a result, bias voltage can be introduced to the solid electrolyte layer to accelerate movements of the positive charge carriers.

The first embodiment of the gas sensor is described with reference to drawings here. A gas sensor, in which a material of a solid electrolyte layer is copper (I) bromide and detection-target gas is ammonia, is described.

Figure 1B:
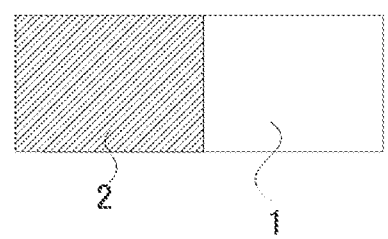
FIG. 1B is a schematic view illustrating one plane of one example of the first embodiment of the disclosed gas sensor.
Figure 1C:
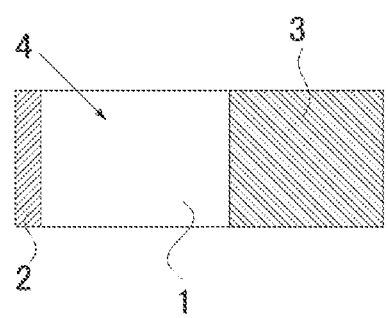
FIG. 1O is a schematic view illustrating the other plane of one example of the first embodiment of the disclosed gas sensor.

The gas sensor illustrated in FIGS. 1A to 1C includes a solid electrolyte layer 1 formed of copper (I) bromide, a first electrode 2 that is a gold electrode, and a second electrode 3 that is a copper electrode. The first electrode 2 is arranged on part of one plane of the solid electrolyte layer 1. The second electrode 3 is arranged on the other plane of the solid electrolyte layer 1 excluding the gas-contacting area 4 that faces the first electrode 2 and is to be in contact with the detection-target gas.

Ammonia is adsorbed onto the gas-contacting area 4 that is a surface of the solid electrolyte layer 1. The ammonia then coordinates to copper ions positioned in the gas-contacting area 4. Since the copper ions, to which the ammonia has coordinated, are fixed in the gas-contacting area 4 of the solid electrolyte layer 1, the copper ions do not function as positive charge carriers. As a result, a concentration of the positive charge carriers in a region of the solid electrolyte layer 1 (the region a in FIG. 1A) between the gas-contacting area 4 and the electrode 2 facing the gas-contacting area 4 reduces.

On the other hand, a region 8 having a surface covered with the second electrode 3 does not cause a reduction at the concentration of the positive charge carriers due to the contact with the gas.

Accordingly, a state where a concentration of the positive charge carriers in the region a and a concentration of the positive charge carrier in the region B within the solid electrolyte layer 1 are different is caused. The positive charge carriers voluntarily move from the region B to the region a to level the concentration within the solid electrolyte layer 1. As a result, the potential difference changes within the solid electrolyte layer 1.

The number of copper ions to be fixed on the gas-contacting area 4 per surface area is determined with adsorption equilibrium of ammonia in the gas-contacting area 4. In the case where the ammonia is contained at low concentration, therefore, the number of the copper ions to be fixed on the gas-contacting area 4 per surface area is proportional to the concentration of the ammonia in the atmosphere. The number of the copper ions to move from the region 8 to the region a to the level of the concentration of the positive charge carriers and the potential difference generated by the movement of the copper ions are proportional to the concentration of the ammonia. Accordingly, the concentration of the detection-target gas can be measured by measuring the potential difference between the first electrode 2 and the second electrode 3.

Next, another example of the first embodiment of the gas sensor is described.

Figure 2:
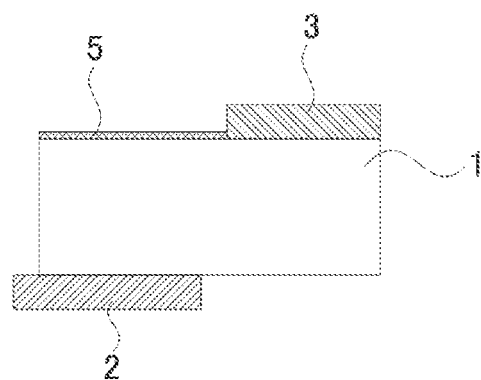
FIG. 2 is a schematic cross-sectional view illustrating another example of the first embodiment of the disclosed gas sensor.

FIG. 2 is a schematic cross-sectional view illustrating another example of the first embodiment of the gas sensor.

In the gas sensor of FIG. 2, a natural rubber layer 5 serving as the unit configured to accelerate movements of the positive charge carriers is arranged on the gas-contacting area of the solid electrolyte layer 1. The structure other than the above is identical to the gas sensor of FIGS. 1A to 1C. A thickness of the natural rubber layer 5 is thin and the natural rubber layer 5 can pass through the detection-target gas.

In the gas sensor of FIG. 2, bias voltage can be introduced to the solid electrolyte layer 1, as the carbon-carbon double bond included in the natural rubber layer 5 supplies electrons to the solid electrolyte layer 1 for doping. As a result, movements of the positive charge carriers are accelerated.

Second Embodiment

The second embodiment of the disclosed gas sensor includes at least a solid electrolyte layer, a first electrode, a second electrode, and a unit configured to accelerate movements of positive charge carriers, and may further include other units according to the necessity.

<<Solid Electrolyte Layer>>

The solid electrolyte layer is not particularly limited, and may be appropriately selected depending on the intended purpose, as long as the solid electrolyte layer is a solid electrolyte layer including positive charge carriers to which detection-target gas coordinates. Examples of the solid electrolyte layer include the solid electrolyte layer listed in the first embodiment of the gas sensor. A preferable embodiment of the solid electrolyte layer is also identical to the preferable embodiment of the solid electrolyte layer listed in the first embodiment of the gas sensor.

The detection-target gas is not particularly limited, and may be appropriately selected depending on the intended purpose, as long as the detection-target gas is a gas capable of coordinating to the positive charge carriers. Examples of the detection-target gas include nitrogen-including compounds, oxygen-containing compounds, and sulfur-containing compounds. Examples of the nitrogen-including compounds include ammonia, amine, and nitric oxide.

Examples of the sulfur-containing compounds include hydrogen sulfide and sulfur dioxide.

<<First Electrode and Second Electrode>>

The first electrode and the second electrode are not particularly limited, and may be appropriately selected depending on the intended purpose, as long as the first electrode and the second electrode are electrodes arranged on a plane of the solid electrolyte layer opposite to a plane of the electrolyte layer to be in contact with the detection-target gas. Examples of the first electrode and the second electrode include the first electrode and the second electrode listed in the gas sensor of the first embodiment. Preferable embodiments of the first electrode and the second electrode are also respectively identical to the preferable embodiments of the first electrode and the second electrode listed in the first embodiment of the gas sensor.

<<Unit Configured to Accelerate Movements of Positive Charge Carriers>>

The unit configured to accelerate movements of the positive charge carriers is not particularly limited, and may be appropriately selected depending on the intended purpose, as long as the unit is a unit configured to accelerate movements of the positive charge carriers in a plane direction of the solid electrolyte layer and in a direction from the second electrode to the first electrode within the solid electrolyte layer. The unit is preferably a voltage source in view of a simple device structure, and preferably the layer covering the solid electrolyte layer that is arranged on at least part of a plane of the solid electrolyte layer to be in contact with the detection-target gas in view of energy saving.

—Voltage Source—

The voltage source is not particularly limited, and may be appropriately selected depending on the intended purpose, as long as the voltage source is a power source capable of applying bias voltage, as long as the voltage source is a power source capable of applying bias voltage in a plane direction of the solid electrolyte layer and in a direction from the second electrode to the first electrode within the solid electrolyte layer.

Since bias voltage is applied in the above-described directions of the solid electrolyte layer using the voltage source, movements of the positive charge carriers are accelerated when the detection-target gas is brought into contact with the plane of the solid electrolyte layer to be in contact with the detection-target gas, and the potential difference between the first electrode and the second electrode changes.

—Layer Covering Solid Electrolyte Layer—

The layer covering the solid electrolyte layer is not particularly limited, and may be appropriately selected depending on the intended purpose, as long as the layer covering the solid electrolyte layer is arranged on at least part of a plane of the solid electrolyte layer to be in contact with the detection-target gas, and is the above-described layer covering the solid electrolyte layer. The layer is preferably a layer, which includes a material capable of coordinating to the positive charge carriers and allows the detection-target gas to pass therethrough, because movements of the positive charge carriers within the solid electrolyte layer are accelerated even more.

Since the layer that includes a material capable of coordinating to the positive charge carriers and allows the detection-target gas to pass therethrough, the layer does not inhibit coordination of the detection-target gas to the positive charge carriers of the solid electrolyte layer.

Examples of the material capable of coordinating to the positive charge carrier include an organic material including a carbon-carbon double bond. Examples of the organic material including a carbon-carbon double bond include natural rubber (polyisoprene), synthetic polyisoprene, polybutadiene, unsaturated fatty acid, unsaturated fatty acid ester, and unsaturated fatty acid amide. Examples of the unsaturated fatty acid include oleic acid and linoleic acid.

Note that, the carbon-carbon double bond has an ability for supplying electrons to atoms and ions of a transition metal to form a coordinate bond. Accordingly, the solid electrolyte layer can be doped with electrons when the organic material coordinates to the positive charge carriers. As a result, bias voltage can be introduced to the solid electrolyte layer to accelerate movements of the positive charge carriers.

The thickness or density of the layer covering the solid electrolyte is preferably changed along the direction from one electrode to the other electrode on a plane of the solid electrolyte layer to be in contact with the detection-target gas. The change of the thickness of the density may be a step-by-step change or a gradual change. In the case where the first electrode is used as a sensing electrode and the second electrode is used as a reference electrode in the gas sensor, the thickness or density of the layer covering the solid electrolyte layer is preferably thicker or denser in the part facing the second electrode than the part facing the first electrode. Movements of the positive charge carriers are accelerated by the above-described thickness or density of the layer.

The second embodiment of the gas sensor is described with reference to drawings here. A gas sensor where a material of a solid electrolyte layer is copper (I) bromide and detection-target gas is ammonia is described.

Figure 3:
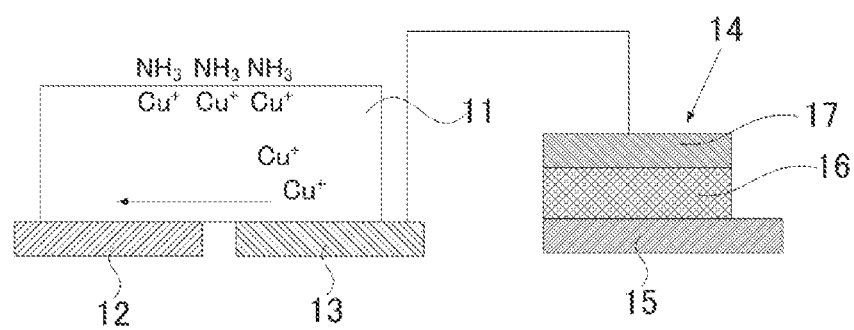
FIG. 3 is a schematic cross sectional view illustrating one example of the second embodiment of the disclosed gas sensor.

FIG. 3 is a schematic cross-sectional view illustrating one example of the second embodiment of the gas sensor. The unit configured to accelerate movements of the positive charge carriers in the gas sensor illustrated in FIG. 3 is a voltage source.

The gas sensor illustrated in FIG. 3 includes a solid electrolyte layer 11 formed of copper (I) bromide, a first electrode 12, a second electrode 13, and a voltage source 14. The first electrode 12 and second electrode 13 are arranged on part of a plane of the solid electrolyte layer 11 opposite to a plane of the solid electrolyte layer 11 to be in contact with the detection-target gas, and with a gap between the first electrode 12 and the second electrode 13. The voltage source 14 has a structure where a copper electrode 15, a solid electrolyte layer 16, and a silver electrode 17 are laminated in this order.

Ammonia is adsorbed on a surface of the solid electrolyte layer 11. The ammonia then coordinates to copper ions positioned on the surface of the solid electrolyte layer 11. The copper ions, to which the ammonia coordinates, are fixed on the surface of the solid electrolyte layer 11, and therefore the copper ions do not function as positive charge carriers. As a result, a concentration of the positive charge carriers decreases inside the solid electrolyte layer 11. If bias voltage is applied from a voltage source 14 to the solid electrolyte layer 11 via the second electrode 13 to be in contact with the solid electrolyte layer 11 at this moment, copper ions are easily moved from the area adjacent to the second electrode 13 having a positive potential to the area adjacent to the first electrode 12 having the lower potential. As a result of the movements of the copper ions, the potential difference between both electrodes changes.

The change in the potential difference depends on the applied bias voltage and a density of positive charge carriers inside the solid electrolyte layer (specifically, an amount of copper ions, per surface area, fixed on the surface of the solid electrolyte layer by ammonia). Therefore, a potential difference corresponding to the concentration of ammonia in the atmosphere is generated, when bias voltage is constant. Accordingly, a concentration of the detection-target gas can be measured by measuring a potential difference between the electrode in contact with the solid electrolyte layer and connected to the voltage source and the other electrode, or a potential difference in a path from the other electrode to the voltage source.

Next, another example of the second embodiment of the gas sensor is described.

Figure 4A:
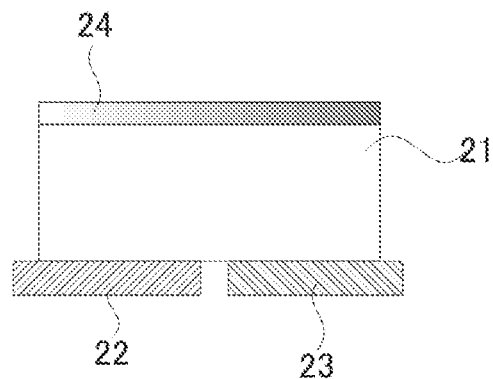
FIG. 4A is a schematic cross-sectional view illustrating another example of the second embodiment of the disclosed gas sensor.
Figure 4B:
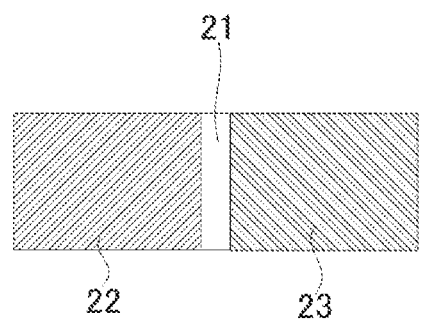
FIG. 4B is a schematic view illustrating one plane of another example of the second embodiment of the disclosed gas sensor.
Figure 4C:
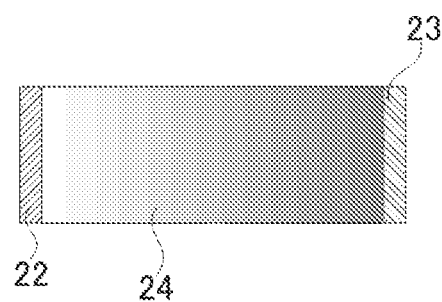
FIG. 4C is a schematic view illustrating the other plane of another example of the second embodiment of the disclosed gas sensor.

FIGS. 4A to 4C are schematic views illustrated another example of the second embodiment of the gas sensor.

The gas sensor of FIGS. 4A to 4C include a solid electrolyte layer 21 formed of copper (I) bromide, a first electrode 22, a second electrode 23, and a layer 24 covering the solid electrolyte layer. The first electrode 22 and the second electrode 23 are arranged on part of the plane of the solid electrolyte layer 11 opposite to the plane of the solid electrolyte layer 11 to be in contact with the detection-target gas. The layer 24 covering the solid electrolyte layer is formed of natural rubber, and an amount of the natural rubber per surface area of the solid electrolyte layer 21 is larger in the area facing the second electrode 23 than the area facing the first electrode 22. The change in the amount is gradual. Note that, in FIGS. 4A and 4C, the change in the amount of the natural rubber is presented with tone of the color for visual clearness. The darker color represents the larger amount of natural rubber.

In the gas sensor of FIGS. 4A to 4C, the amount of the natural rubber per surface area of the solid electrolyte layer 21 is larger in the area of the layer 24 covering the solid electrolyte layer facing the second electrode 23 than the area facing the first electrode 22, and therefore a doping amount of electrons is larger at the solid electrolyte layer 21 at the side of the second electrode 23 than at the side of the first electrode 22. The potential of the first electrode 22 is higher than the potential of the second electrode 23 due to a difference in the doping amount of electrons. When the detection-target gas is brought into contact with the solid electrolyte layer 21, moreover, the larger amount of the detection-target gas is fixed on the region adjacent to 22, in which the amount of the natural rubber per area covering the solid electrolyte layer 21 is smaller than the second electrode 23. In the solid electrolyte layer 21, the positive charge carriers are lacked more at the first electrode 22 side of a region being away from the layer 24 covering the solid electrolyte layer than the second electrode 23 side of the region. In the solid electrolyte layer 21, the positive charge carriers are diffused from the side of the second electrode 23 to the side of the first electrode 22 in order to return to a state where the carrier concentration is leveled. As a result, the potential at the side of the first electrode 22 becomes higher than the potential at the side of the second electrode 23.

In FIGS. 4A to 4C, the embodiment where the amount of the natural rubber in the layer 24 covering the solid electrolyte layer per surface area of the solid electrolyte layer 21 is gradually changed is illustrated, but the embodiment of the layer 24 covering the solid electrolyte layer is not limited to the above-mentioned embodiment. The amount may be changed step by step. Moreover, the layer 24 covering the solid electrolyte layer may be formed on only part of the surface of the solid electrolyte layer to be in contact with the detection-target gas, as long as movements of the positive charge carriers are accelerated.

The disclosed gas sensor can solve the above-described various problems existing in the art, and can provide a gas sensor, which does not need a supply of electric current using a constant-current power supply, does not need to be heated, and can be used with energy-saving efficiency.

(Sensor Device)

The disclosed sensor device includes at least the disclosed gas sensor and a unit configured to detect a change in a potential difference of the gas sensor, and may further include other units according to the necessity.

<Unit Configured to Detect Change in Potential Difference of Gas Sensor>

The unit configured to detect a change in a potential difference of the gas sensor is not particularly limited, and may be appropriately selected depending on the intended purpose. The unit is preferably a field-effect transistor because the sensor device can be down sized, and the change in the potential difference can be amplified.

The unit configured to detect a change in a potential difference of the gas sensor is connected to the first electrode of the gas sensor.

<<Field-Effect Transistor>>

The field-effect transistor is not particularly limited, and may be appropriately selected depending on the intended purpose. Examples of the field-effect transistor include a field-effect transistor including a gate electrode configured to apply gate voltage, a source electrode and a drain electrode configured to take electric current out, an active layer arranged between the source electrode and the drain electrode, and a gate insulating layer arranged between the gate electrode and the active layer. Examples of a material of the active layer include silicon, and metal oxide semiconductors.

The first electrode of the gas sensor is connected to the gate electrode.

One example of the disclosed sensor device is described with reference to a drawing.

Figure 5:
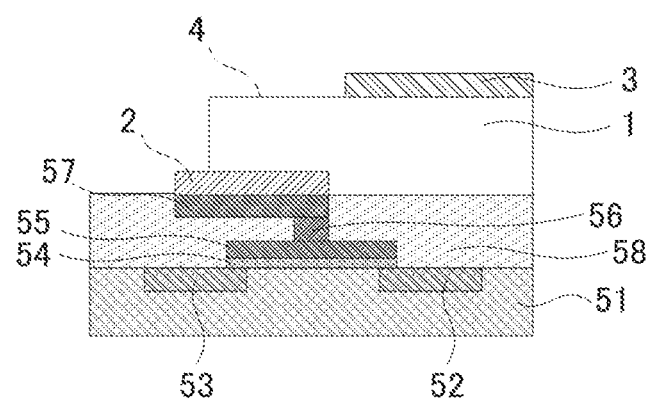
FIG. 5 is a schematic cross-sectional view illustrating one example of the disclosed sensor device.

FIG. 5 is a schematic cross-sectional view illustrating one example of the sensor device.

The sensor device illustrated in FIG. 5 includes a gas sensor and a field-effect transistor. The gas sensor includes a solid electrolyte layer 1, a first electrode 2, and a second electrode 3. The first electrode 2 is arranged on part of one plane of the solid electrolyte layer 1. The second electrode 3 is arranged on an area of the other plane of the solid electrolyte layer 1, where the area excludes the gas-contacting area 4 of the other plane that faces the first electrode 2 and is to be in contact with the detection-target gas. The field-effect transistor includes a silicon substrate 51 also functioning as an active layer, a source electrode 52, a drain electrode 53, a gate insulating layer 54, and a gate electrode 55. The gate electrode 52 and the drain electrode 53 are arranged to sandwich the active layer. The gate insulating layer 54 is arranged between the active layer and the gate electrode 55. The first electrode 2 of the gas sensor and the gate electrode 55 of the field-effect transistor are connected together via the first line 56 and the second line 67. Then, the insulating layer 58 is formed to cover the gate insulating layer 54, the gate electrode 55, the first line 56, and the second line 57, and the gas sensor is arranged on the insulating layer 58.

The disclosed sensor device can solve the above-described various problems existing in the art, and can provide a sensor device, which does not need to be heated, and can be used with energy-saving efficiency.

EXAMPLES

Examples of the present invention are explained below, but the present invention is not limited to the examples below in any way.

Example 1

Figure 6A:
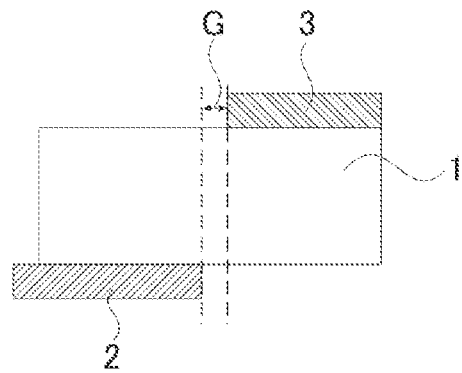
FIG. 6A is a schematic cross-sectional view of the gas sensor of Example 1.
Figure 6B:
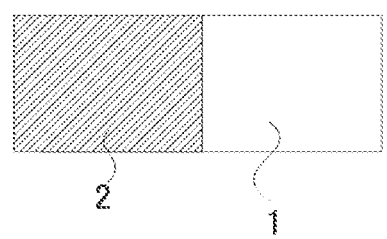
FIG. 6B is a schematic view of one plane of the gas sensor of Example 1.
Figure 6C:
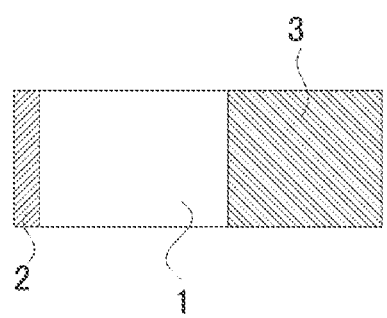
FIG. 6C is a schematic view of the other plane of the gas sensor of Example 1.

A gas sensor as illustrated in FIGS. 6A to 6C was produced. Specifically, the gas sensor was produced by the following method.
<Formation of First Electrode>
A gold electrode (first electrode 2) having the width of 10 mm, the length of 25 mm, and the average thickness of 30 nm was formed by vacuum deposition on a silicon wafer with a thermally oxidized film having the average thickness of 1 μm, where the silicon wafer had the width of 12 mm, the length of 50 mm, and the thickness of 0.6 mm.
<Formation of Solid Electrolyte Layer>
A copper layer having the width of 8 mm, the length of 30 mm, and the average thickness of 0.5 μm was formed by vacuum deposition to cover part of the first electrode 2. Subsequently, copper of the copper layer was turned into copper (I) bromide using a copper (II) bromide aqueous solution using the same method as the method described in "2. Experimental" of the literature (Pascal Lauque, Marc Bendahan, Jean-Luc Seguin, Kieu An Ngo, Philippe Knauth, Analytica Chimica Acta, 515, (2004), 279-284), to thereby obtain a solid electrolyte layer 1. The average thickness of the obtained solid electrolyte layer was 0.5 μm.
<Formation of Second Electrode>
Moreover, a copper layer having the width of 10 mm, the length of 25 mm, and the average thickness of 60 nm was formed by vacuum deposition in a manner that a gap G between the copper layer and the first electrode 2 was to be 1 mm, as illustrated in FIG. 6A. A gold layer having the average thickness of 30 nm was formed on the copper layer by vacuum deposition to thereby obtain a laminate structure of the copper layer and the gold layer (second electrode 3). In the manner as described, a gas sensor was obtained.

The gap G means a gap between the edge of the projected first electrode 2 and the edge of the second electrode 3 facing each other, when the first electrode 2 is projected to the other plane of the solid electrolyte layer 1 facing one plane of the solid electrolyte layer 1 to which the first electrode 2 is arranged.
<Evaluation on Change in Potential Difference>
196 system DMM available from Keithley was connected to the produced gas sensor in a manner that the first electrode 2 was to be a sensing electrode and the second electrode 3 was to be a reference electrode, and a potential difference between the both electrodes was measured. A reaction of the gas sensor to ammonia was evaluated by placing the gas sensor in a flow path of nitrogen gas, and switching a gas source between nitrogen gas of high purity and nitrogen gas including ammonia at the concentration of 1 ppm. The evaluation of the reaction of the gas sensor was performed at normal temperature without heating the gas sensor.

Note that, the nitrogen gas of high purity was used at a flow rate of 4.0 L/min. The nitrogen gas including ammonia at the concentration of 1 ppm was generated using a permeator (product name: PD-1B, available from GASTEC CORPORATION), and was used by generating under the conditions that a temperature was 30° C., and a flow rate was 2.8 L/min.

Figure 7:
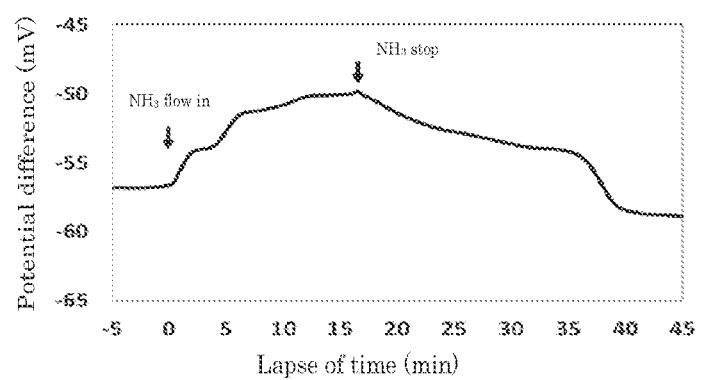
FIG. 7 is a graph presenting the result of the measurement of the potential difference of the gas sensor of Example 1.

A relationship between the measured potential difference and the lapse of time is presented in FIG. 7. Even in the state where the nitrogen gas of high purity was to be in contact with the solid electrolyte layer 1, the potential of the reference electrode was higher than the potential of the sensing electrode by about 56 mV due to equilibrium of the oxidation-reduction reaction of cupper occurred at the interface between the copper (I) bromide and the surface of the copper electrode. When the air flow was changed from the nitrogen gas of high purity to the nitrogen gas including ammonia at the concentration of 1 ppm, the potential of the sensing electrode became high, and as a result, the measured potential difference became small by about 6 mV. Accordingly, it could be confirmed that the gas sensor of Example 1 was a gas sensor of high sensitivity and a potential difference measuring system.

Example 2

Figure 8A:
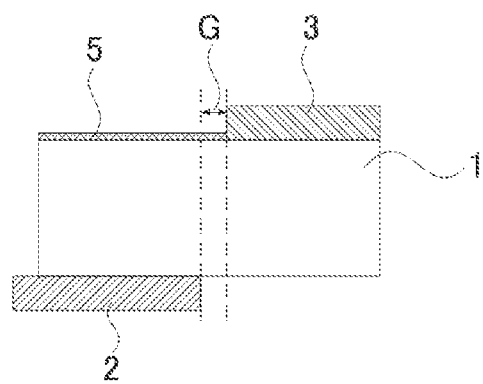
FIG. 8A is a schematic cross-sectional view of the gas sensor of Example 2.
Figure 8B:
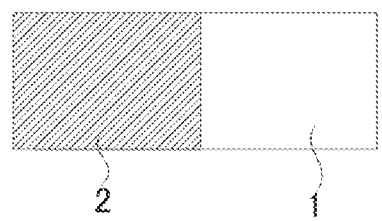
FIG. 8B is a schematic view of one plane of the gas sensor of Example 2.
Figure 8C:
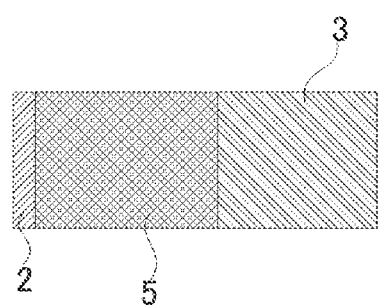
FIG. 8C is a schematic view of the other plane of the gas sensor of Example 2.

A gas sensor as illustrated in FIGS. 8A to 8C was produced. Specifically, the gas sensor was produced by the following method.
<Formation of First Electrode>
A gold electrode (first electrode 2) having the width of 10 mm, the length of 20 mm, and the average thickness of 60 nm was formed by vacuum deposition on a silicon wafer with a thermally oxidized film having the average thickness of 1 μm, where the silicon wafer had the width of 12 mm, the length of 50 mm, and the thickness of 0.6 mm.

<Formation of Solid Electrolyte Layer>

Copper (I) bromide (solid electrolyte layer 1) having the width of 8 mm, the length of 30 mm, and the average thickness of 200 nm was formed by RF magnetron sputtering to cover part of the first electrode 2.

The conditions for the RF magnetron sputtering were as follows.

RF power: 100 W
Sputtering gas: Ar
Sputtering gas flow rate: 30 sccm
Gas pressure: 0.5 Pa <Formation of Second Electrode>

Moreover, a gold electrode (second electrode 3) having the width of 10 mm, the length of 20 mm, and the average thickness of 60 nm was formed by vacuum deposition in a manner that the gap G between the gold electrode and the first electrode 2 was to be 1 mm, as illustrated in FIG. 8A to thereby obtain a gas sensor.

The gap G means a gap between the edge of the projected first electrode 2 and the edge of the second electrode 3 facing each other, when the first electrode 2 is projected to the other plane of the solid electrolyte layer 1 facing one plane of the solid electrolyte layer 1 to which the first electrode 2 is arranged.

<Covering with Natural Rubber>

The obtained gas sensor was dipped in a natural rubber hexane solution (a concentration of the natural rubber was 0.01% by volume) for 1 minute, and surfaces of the gas sensor was washed with hexane. Thereafter, the gas sensor was dried through a baking process performed in nitrogen at 100° ° C. for 30 minutes to fix the natural rubber layer 5 to an area of the solid electrolyte layer 1 to be in contact with detection-target gas.

<Evaluation on Change in Potential Difference>

Figure 9:
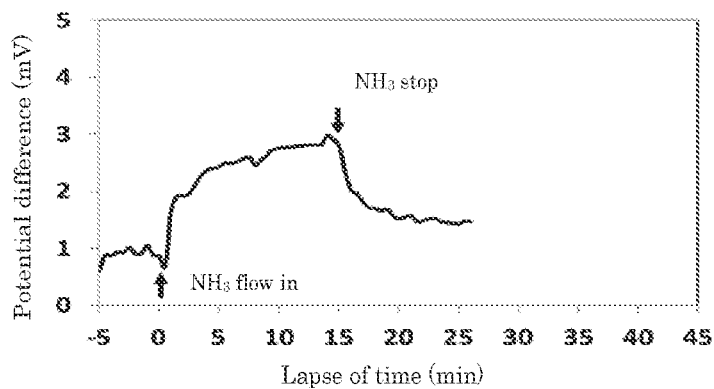
FIG. 9 is a graph presenting the result of the measurement of the potential difference of the gas sensor of Example 2.

An evaluation of a change in potential difference was performed in the same manner as in Example 1 by using the first electrode 2 as a sensing electrode and the second electrode 3 as a reference electrode, and using nitrogen gas including ammonia at the concentration of 1 ppm. The result is presented in FIG. 9.

In the nitrogen gas of high purity, the potential at the side of the sensing electrode was high by about 1 mV due to the movements of the cupper ions owing to the doping of electrons from the natural rubber. This is an equivalent to bias voltage. When the air flow was changed from the nitrogen gas of high purity to the nitrogen gas including ammonia at the concentration of 1 ppm, the potential of the sensing electrode became high by about 2 mV.

As described above, it was confirmed that the organic material including a carbon-carbon double bond could be used as the unit configured to accelerate movements of the positive charge carriers of the solid electrolyte layer Moreover, it was confirmed that the gas sensor of Example 2 was a gas sensor of high sensitivity and a potential difference measuring system.

Example 3

Figure 10:
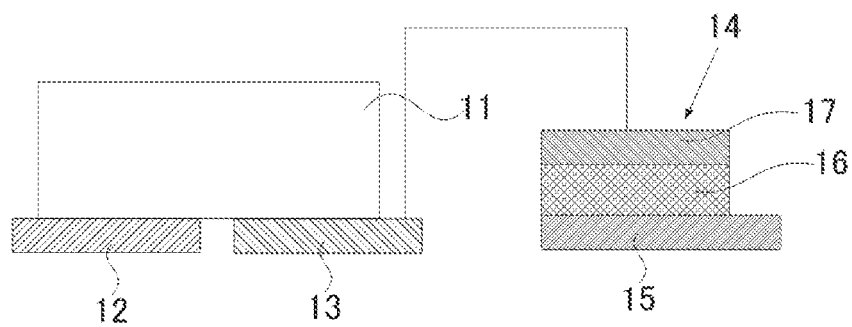
FIG. 10 is a schematic cross-sectional view of the gas sensor of Example 3.

A gas sensor as illustrated in FIG. 10 was produced. Specifically, the gas sensor was produced by the following method.

<Formation of First Electrode and Second Electrode>

Two gold electrodes (first electrode 12 and second electrode 13) each having the width of 10 mm, the length of 25 mm, and the average thickness of 30 nm were formed by vacuum deposition on a silicon wafer with a thermally oxidized film having the average thickness of 1 μm, where the silicon wafer had the width of 12 mm, the length of 55 mm, and the thickness of 0.6 mm. The two gold electrodes were arranged with the gap of 1 mm between the edges of the two gold electrodes facing each other.

<Formation of Solid Electrolyte Layer>

A copper layer having the width of 8 mm, the length of 30 mm, and the average thickness of 0.5 μm was formed by vacuum deposition on each of the two gold electrodes. Subsequently, copper of the copper layers was turned into copper (I) bromide using a copper (II) bromide aqueous solution using the same method as the method described in "2. Experimental" of the literature (Pascal Lauque, Marc Bendahan, Jean-Luc Seguin, Kieu An Ngo, Philippe Knauth, Analytica Chimica Acta, 515, (2004), 279-284), to produce a solid electrolyte layer 11 to thereby obtain a detector.

<Production of Bias Voltage Source>

On a silicon wafer with a thermally oxidized film, a copper electrode 15 having the width of 8 mm, the length of 20 mm, and the average thickness of 30 nm, a copper (I) bromide layer (solid electrolyte layer 16) having the width of 8 mm, the length of 15 mm, and the average thickness of 0.5 μm, and a silver electrode 17 having the width of 8 mm, the length of 15 mm, and the average thickness of 30 nm were formed in this order in the same methods in <Formation of first electrode and second electrode> and <Formation of solid electrolyte layer> above. The obtained laminate structure was used as a bias voltage source (voltage source 14).

The silver electrode 17 of the voltage source 14 and one of the gold electrodes (second electrode 13) of the detector were connected together to thereby obtain a gas sensor.

A reaction to ammonia was evaluated by using a structure where the copper electrode 15 of the voltage source 14 was used as a reference electrode and the other gold electrode (first electrode 12) of the detection body was used as a sensing electrode, placing the gas sensor in the flow of the nitrogen gas, and switching the gas source between nitrogen gas of high purity and nitrogen has including ammonia at the concentration of 1 ppm, while measuring the potential difference between the both electrodes, in the same manner as in Example 1. At the time of the evaluation, the voltage from the bias voltage source was −90±3 m V.

Figure 11:
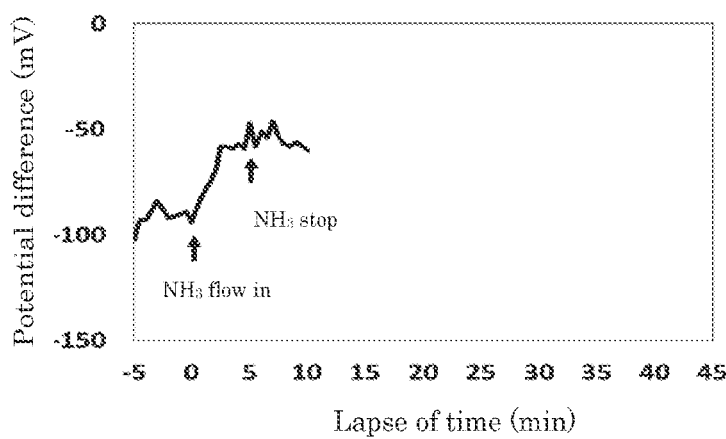
FIG. 11 is a graph presenting the result of the measurement of the potential difference of the gas sensor of Example 3.

A relationship between the measured potential difference and the lapse of time is presented in FIG. 11. Even in the state where the nitrogen gas of high purity was to be in contact with the solid electrolyte layer 11, the potential of the reference electrode was higher than the potential of the sensing electrode by about 100 mV due to equilibrium of the oxidation reduction reaction of cupper occurred at the interface between the copper (I) bromide and the surface of the copper electrode. When the air flow was changed from the nitrogen gas of high purity to the nitrogen gas including ammonia at the concentration of 1 ppm, the potential of the sensing electrode became high, and as a result, the measured potential difference became small by about 50 mV.

It was confirmed that a gas sensor of high sensitivity and a potential difference measuring system could be obtained with a structure where a plurality of the electrodes were disposed not to inhibit contact between the surface of the solid electrolyte layer and the atmosphere, and bias voltage is applied into the solid electrolyte layer in the direction substantially parallel to the plane to be in contact with the detection-target gas, and by using one of the electrodes in contact with solid electrolyte layer as a sensing electrode, and the electrode at the side of the bias voltage source not connected to the solid electrolyte layer as a reference electrode, as described above.

Example 4

Figure 12A:
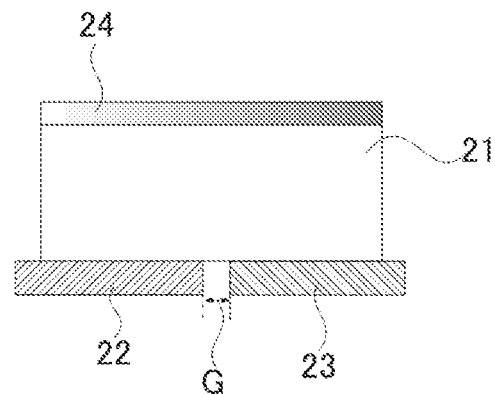
FIG. 12A is a schematic cross-sectional view of the gas sensor of Example 4.
Figure 12B:
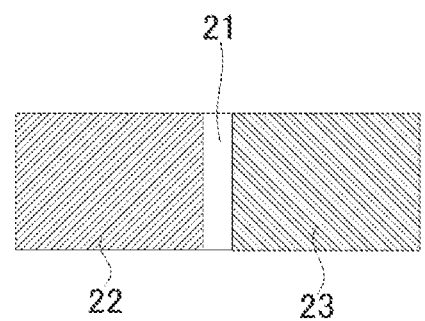
FIG. 12B is a schematic view of one plane of the gas sensor of Example 4.
Figure 12C:
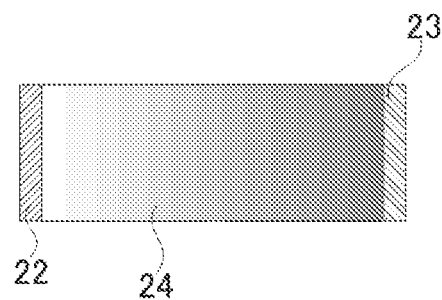
FIG. 12C is a schematic view of the other plane of the gas sensor of Example 4.

A gas sensor as illustrated in FIGS. 12A to 12C was produced. Specifically, the gas sensor was produced by the following method.

<Formation of First Electrode and Second Electrode>

Two gold electrodes (first electrode 22 and second electrode 23) each having the width of 10 mm, the length of 20 mm, and the average thickness of 60 nm were formed by vacuum deposition on a silicon wafer with a thermally oxidized film having the average thickness of 1 µm, where the silicon wafer had the width of 12 mm, the length of 55 mm, and the thickness of 0.6 mm. The two gold electrodes were arranged with the gap of 1 mm between the edges of the two gold electrodes facing each other.

<Formation of Solid Electrolyte Layer>

Copper (I) bromide (solid electrolyte layer 21) having the width of 8 mm, the length of 30 mm, and the average thickness of 200 nm was formed by RF magnetron sputtering on the two gold electrodes, to thereby obtain a device.

The conditions of the RF magnetron sputtering were the same as in Example 2.

<Covering with Natural Rubber>

The obtained device was dipped in a natural rubber hexane solution (a concentration of the natural rubber was 0.01% by volume) for 1 minute. Thereafter, the device was dried while the hexane solution was allowed to run down on the surface of the solid electrolyte layer 21 in the state where a long side of the silicon wafer was set substantially vertical. Specifically, at the time of the above-mentioned drying process, a state where an amount of the natural rubber per unit area of the surface of the solid electrolyte layer 21 was small at the top side and the amount was large at the bottom side was formed, and the layer 24, which was a natural rubber layer and covers the solid electrolyte, was obtained. The resultant device was stored in a nitrogen flow for 24 hours at room temperature before use, to thereby obtain a gas sensor. Note that, in FIGS. 12A and 12C, the amount of the natural rubber per unit area of the layer 24 covering the solid electrolyte was presented with tone of the color. Specifically, the darker color represented the larger amount of the natural rubber.

<Evaluation on Change in Potential Difference>

Figure 13:
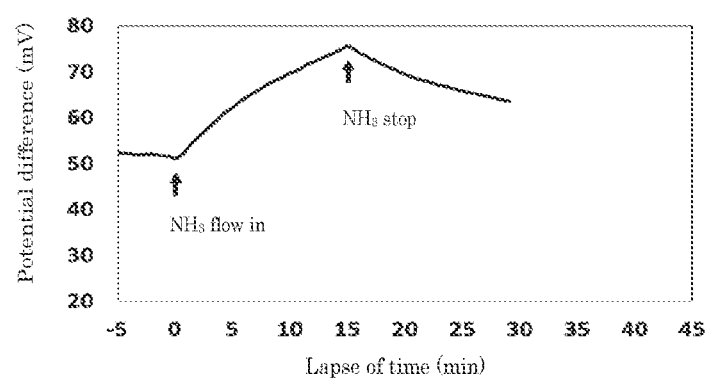
FIG. 13 is a graph presenting the result of the measurement of the potential difference of the gas sensor of Example 4.

An evaluation of a change in potential difference was performed by using, as a reference electrode, the gold electrode (second electrode 23) that was at the bottom side at the time of the drying, using, as a sensing electrode, the gold electrode (first electrode 22) that was at the top side, and using nitrogen gas including ammonia at the concentration of 1 ppm in the same manner as in Example 1. The result is presented in FIG. 13.

Since the amount of electrons doped from the natural rubber was large at the side of the reference electrode and was small at the side of the sensing electrode, the potential was high at the side of the sensing electrode by 51±1 mV in the nitrogen gas atmosphere. This is an equivalent to bias voltage. When the air flow was changed from the nitrogen gas of high purity to the nitrogen gas including ammonia at the concentration of 1 ppm, the potential of the sensing electrode became high by about 25 mV.

As described above, it was confirmed that the gas sensor of Example 4 was a gas sensor of high sensitivity and a potential difference measuring system.

Comparative Example 1

Figure 14A:
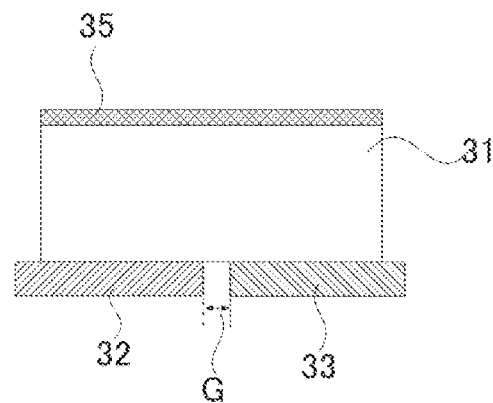
FIG. 14A is a schematic cross-sectional view of the gas sensor of Comparative Example 1.
Figure 14B:
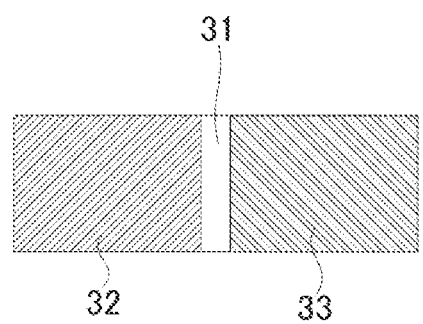
FIG. 14B is a schematic view of one plane of the gas sensor of Comparative Example 1.
Figure 14C:
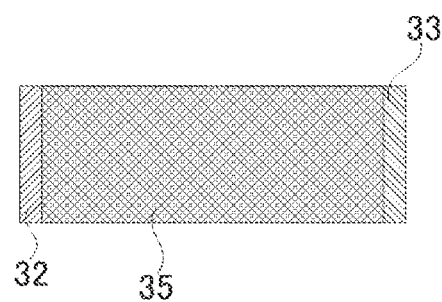
FIG. 14C is a schematic view of the other plane of the gas sensor of Comparative Example 1.

A gas sensor as illustrated in FIGS. 14A to 14C was produced. Specifically, the gas sensor was produced by the following method.

<Formation of First Electrode and Second Electrode>

Two gold electrodes (first electrode 32 and second electrode 33) each having the width of 10 mm, the length of 20 mm, and the average thickness of 60 nm were formed by vacuum deposition on a silicon wafer with a thermally oxidized film having the average thickness of 1 µm, where the silicon wafer had the width of 12 mm, the length of 55 mm, and the thickness of 0.6 mm. The two gold electrodes were arranged with the gap of 1 mm between the edges of the two gold electrodes facing each other.

<Formation of Solid Electrolyte Layer>

Copper (I) bromide (solid electrolyte layer 31) having the width of 8 mm, the length of 30 mm, and the average thickness of 200 nm was formed by RF magnetron sputtering on the two gold electrodes, to thereby obtain a device. The conditions of the RF magnetron sputtering were the same as in Example 2.

<Covering with Natural Rubber>

The obtained gas sensor was dipped in a natural rubber hexane solution (a concentration of the natural rubber was 0.01% by volume) for 1 minute, and surfaces of the gas sensor was washed with hexane. Thereafter, the gas sensor was dried through a baking process performed in nitrogen at 100° C. for 30 minutes. The natural rubber layer 35 formed on the solid electrolyte layer 31 was uniformly formed on the solid electrolyte layer 31.

<Evaluation on Change in Potential Difference>

Figure 15:
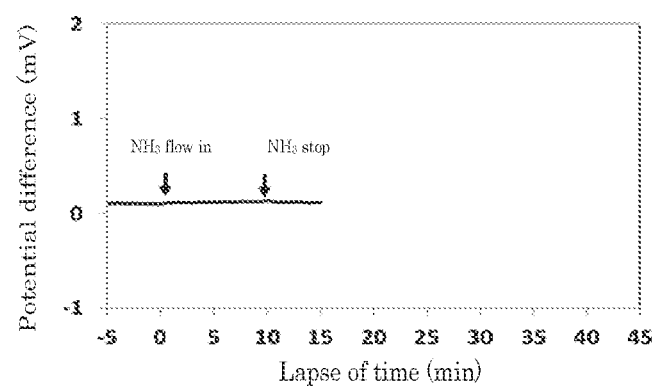
FIG. 15 is a graph presenting the result of the measurement of the potential difference of the gas sensor of Comparative Example 1.

An evaluation was performed in the same manner as in Example 1 by using one of the two gold electrodes as a reference electrode and the other as a sensing electrode, and using nitrogen gas including ammonia at the concentration of 1 ppm. The result is presented in FIG. 15.

In this case, there has hardly any potential difference between the both electrodes, because there was not difference in the structure between the reference electrode and the sensing electrode. Even when the air flow was switched from the nitrogen gas of high purity to the nitrogen gas including ammonia at the concentration of 1 ppm, the natural rubber layer 35 did not function as the unit configured to accelerate movements of the positive charge carriers, and the potential difference between the both electrodes hardly changed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the sprit and scope of the invention.

What is claimed is:

1. A gas sensor comprising:
   a solid electrolyte layer including positive charge carriers to which detection-target gas is to coordinate and has a contact plane to be in contact with the detection-target gas;
   a first electrode and a second electrode, both of which are arranged on a plane of the solid electrolyte layer opposite to the contact plane of the solid electrolyte layer; and
   a unit configured to accelerate movements of the positive charge carriers, where the movements of the positive charge carriers are movements in a plane direction of the solid electrolyte layer and in a direction from the second electrode to the first electrode within the solid electrolyte layer, wherein the unit configured to accelerate movements of the positive charge carriers is arranged on at least part of a plane of the solid electrolyte layer to be in contact with the detection-target gas, and the unit is a layer covering the solid electrolyte layer, wherein thickness or density of the layer covering the solid electrolyte layer varies from the first electrode toward the second electrode.

2. The gas sensor according to claim 1,
wherein the layer covering the solid electrolyte layer is a layer that includes a material capable of coordinating to the positive charge carriers and allows the detection-target gas to pass therethrough.

3. The gas sensor according to claim 2,
wherein the material capable of coordinating to the positive charge carriers is an organic material including a carbon-carbon double bond.

4. The gas sensor according to claim 3,
wherein the organic material including a carbon-carbon double bond is polyisoprene rubber, natural rubber, or polybutadiene rubber.

5. The gas sensor according to claim 1,
wherein the positive charge carriers are copper ions, or silver ions, or both copper ions and silver ions.

6. The gas sensor according to claim 1,
wherein the positive charge carriers are copper ions.

7. The gas sensor according to claim 1,
wherein a material of the solid electrolyte layer is copper (I) bromide, copper (I) sulfide, silver sulfide, silver iodide, or silver rubidium iodide.

8. The gas sensor according to claim 1,
wherein a material of the solid electrolyte layer is copper (I) bromide.

9. A sensor device comprising:
the gas sensor according to claim 1; and
a unit configured to detect a change in a potential difference of the gas sensor, where the unit configured to detect a change in a potential difference of the gas sensor is connected to the first electrode of the gas sensor.

10. The sensor device according to claim 9, wherein the unit configured to detect a change in a potential difference of the gas sensor is a field-effect transistor.

* * * * *